UNITED STATES PATENT OFFICE.

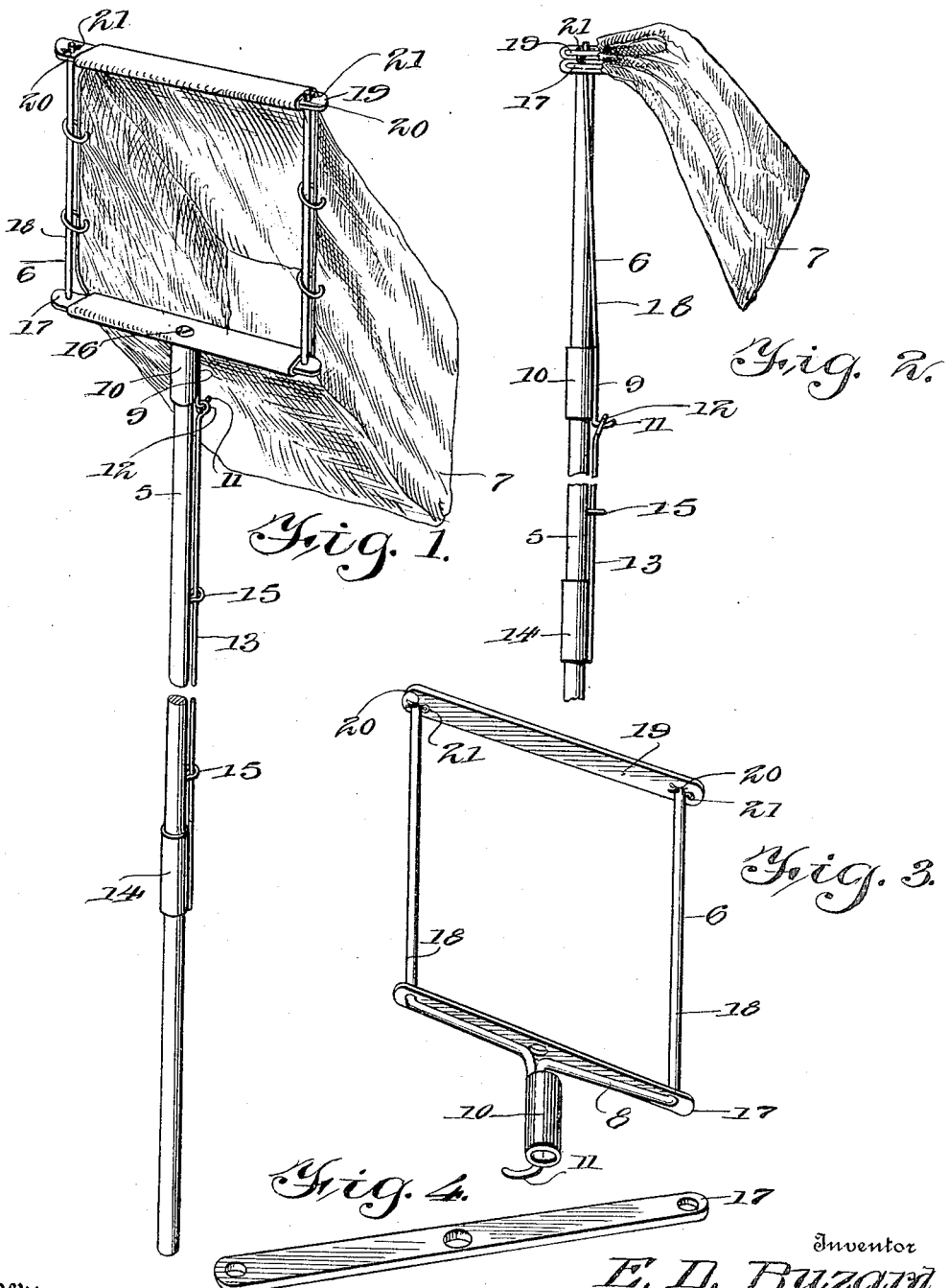

EDMIRL D. BUZARD, OF PITTSBURGH, PENNSYLVANIA.

FRUIT-PICKER.

1,133,927.  Specification of Letters Patent.  Patented Mar. 30, 1915.

Application filed September 25, 1914. Serial No. 863,594.

*To all whom it may concern:*

Be it known that I, EDMIRL D. BUZARD, a citizen of the United States, residing at Pittsburgh, in the county of Allegheny and State of Pennsylvania, have invented new and useful Improvements in Fruit-Pickers, of which the following is a specification.

This invention relates to fruit pickers and has for its primary object the provision of a device of this character, wherein apples, oranges and the like can be quickly gathered from the tree without any possibility of bruising or otherwise injuring the same.

To this end the invention essentially consists of a suitable handle supporting a bag at one end for the reception of the fruit as the latter is picked, and means for separating the fruit from the tree.

In carrying out my invention I further aim to provide a construction wherein the bag can be readily attached to or detached from the handle as the occasion may demand.

Other objects of the invention will appear as the following description is read in connection with the accompanying drawing wherein like numerals of reference indicate similar parts in the several views and in which:—

Figure 1 is a perspective view showing the bag in open position. Fig. 2 is a view showing the bag closed. Fig. 3 is a detail view of the frame. Fig. 4 is a view of one of the cross bars.

Referring more particularly to the drawing the device comprises a handle 5 constructed of any suitable material and of any desired length, and carries at one end a substantially U-shaped frame 6 preferably constructed of wire, and which supports the bag 7. The cross piece 8 of the frame has a portion 9 projecting rearwardly from the medial point thereof and is soldered or otherwise connected to the sleeve 10, the latter being slidably mounted on the handle 5. The portion 9 terminates in a hook 11 which engages the eye 12 formed on one end of the operating rod 13, the opposite end of the latter being connected to the hand grip 14 mounted for sliding movement on the handle 5, the operating rod 13 being guided in its movement by the guide eyes 15 secured to the handle at intervals.

Removably secured to the outer end of the handle 5 by means of the screw 16 is a flat cross bar 17 having openings adjacent the opposite ends thereof for slidably receiving the parallel limbs 18 of the frame. A similar cross bar 19 is mounted on the limbs 18 between spaced pairs of apertures 20, through which are passed cotter pins 21 to retain the said bar in position upon the frame. The cross bars 17 and 19 are passed through loops formed at the mouth of the bag, whereby the latter is opened and closed as the hand grip 14 is moved longitudinally upon the handle.

In use the bag is placed beneath the fruit, and the hand grip 14 pushed downwardly on the handle, thus closing the mouth of the bag over the fruit, the bars 17 and 19 operating to release the same from the tree, whereupon it is deposited in the bag. The hand grip 14 is then moved upwardly opening the bag for another similar operation. When a sufficient quantity of fruit has been gathered or the bag filled, the latter is closed, lowered to the ground and emptied into a suitable receptacle. It is manifest that with a device of this nature the duty of gathering fruit is not only expeditiously performed but that little or no fruit is bruised or otherwise injured during this operation.

By reason of the construction and more particularly the manner of supporting the bag, it will be obvious that the latter may be quickly removed to be washed, or replaced by a new bag. In this connection it is only necessary to remove the screw 16 and the cotter pins 21 after which the cross bars 17 and 19 and the bag can be slipped off the frame, this operation requiring but few minutes.

It is believed that from the foregoing description taken in connection with the accompanying drawing that the nature and advantages of the invention will be thoroughly understood without requiring a more extended explanation and therefore the same has been omitted.

What I claim is:—

A fruit picker comprising a handle, a stationary cross arm fixed on the upper end thereof, a sleeve slidably mounted on the handle, a U-shaped frame carried by the sleeve and slidable through said arm, a second arm fixed to the extremities of said frame and disposed above and in parallelism with the said first mentioned arm, a bag having loops at the mouth thereof, said arms being disposed within said loops and adapted to open and close the bag on sliding movement of the frame longitudinally of the handle, a hand grip adjustably mounted on the handle, and an operating rod connecting said handle and frame.

In testimony whereof I, affix my signature in presence of two witnesses.

EDMIRL D. BUZARD.

Witnesses:
R. O. BAKER,
J. M. SYBERT.

Copies of this patent may be obtained for five cents each, by addressing the "Commissioner of Patents, Washington, D. C."